United States Patent

[11] 3,563,619

| | | | | | | |
|---|---|---|---|---|---|---|
| [72] | Inventor | Philip H. Evans | | 2,631,069 | 3/1953 | Starr............ 308/22 |
| | | Stourbridge, England | | 2,886,380 | 5/1959 | Lambeek............ 308/72 |
| [21] | Appl. No. | 773,421 | | 2,943,893 | 7/1960 | Siebert............ 308/72 |
| [22] | Filed | Nov. 5, 1968 | | | FOREIGN PATENTS | |
| [45] | Patented | Feb. 16, 1971 | | 1,062,177 | 12/1953 | France............ 308/22 |
| [73] | Assignee | BSR Limited | | 883,532 | 7/1953 | Germany............ 308/15 |
| | | Worcester, England | | 68,540 | 11/1944 | Norway............ 308/15 |
| [32] | Priority | Nov. 8, 1967 | | | | |
| [33] | | Great Britain | | | | |
| [31] | | 50,705/67 | | | | |

*Primary Examiner* — Martin P. Schwadron
*Assistant Examiner* — Irwin C. Cohen
*Attorney* — Kurt Kelman

[54] BEARINGS
1 Claim, 2 Drawing Figs.

[52] U.S. Cl............................................. 308/15, 308/72

[51] Int. Cl............................................. F16c 27/04, F16c 35/06

[50] Field of Search............................ 308/15, 22, 72

[56] References Cited
UNITED STATES PATENTS
2,001,383 5/1935 Freed............ 308/72
2,019,569 11/1935 Justesen............ 308/72

ABSTRACT: A bearing assembly for a rotating shaft comprising a support bracket having a substantially circular aperture in which is mounted a substantially cylindrical bearing housing having therein a self-aligning bearing sleeve through which the shaft passes, the bearing housing having an end cap with two arms projecting parallel to the axis of the housing and engaging in grooves on the exterior of the housing, each arm having an outwardly turned lug which engages against the side face of the bracket and there being a spring disposed within the housing and acting against the end cap to urge it outwardly and urge the said lugs into engagement with the said side face of the bracket.

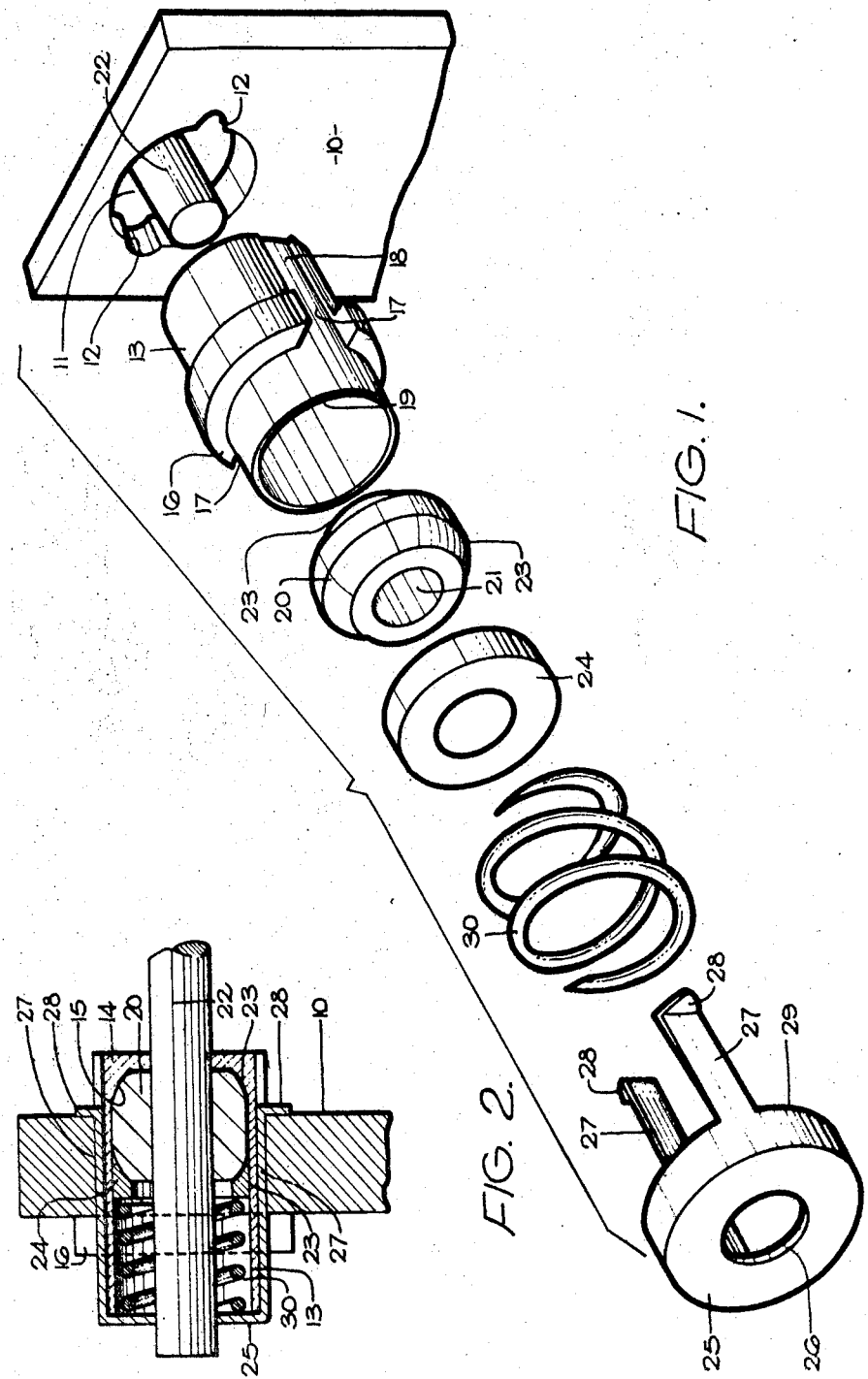

BEARINGS

BACKGROUND OF THE INVENTION

This invention relates to bearings for rotating shafts and is primarily intended for light load applications such as, for example, rotating shafts in tape recorders and tape players, record players and other domestic apparatus such as refrigerators and washing machines and the like which are generally made on a mass production basis on a moving assembly line and the invention aims to provide a simple bearing assembly which is easy to assemble or disassemble for servicing and which can be easily and rapidly fitted on a moving assembly line not requiring highly skilled labor.

Although the above is the primary application at which the invention is aimed, it is to be appreciated that this is not the exclusive field as the invention could well be applied to bearings and bearing assemblies in many other fields.

SUMMARY OF THE INVENTION

According to the invention there is provided a bearing assembly for a rotating shaft comprising a fixed support member to carry the bearing assembly and having a circular cross section opening extending therethrough in which the bearing assembly is mounted, a bearing housing having a cylindrical exterior portion which engages in said opening, an end cap which fits on one end of said housing and has at least one arm projecting therefrom parallel to the axis of the housing and lying within a groove, parallel to the axis, in the exterior of the housing, the or each arm having at its free end a radially outwardly projecting lug which can pass through an aperture extending through the fixed support and formed on the periphery of said opening through the support, so that upon fitting the bearing housing, with its cap thereon, into said opening the assembly of cap and housing can be rotated through an appropriate angle to move the or each said lug out of register with its aperture thereby preventing withdrawal of the bearing housing and holding it in position in the support member.

Preferably, the assembly of end cap and bearing housing includes a spring located therein and disposed so as to act at one end against the inner face of the end of the cap and at the other end against an abutment within the bearing housing so as to tend to urge the cap outwardly away from the bearing housing and with this arrangement, when the assembly of cap and bearing housing is fitted in the support member, the effect of such spring is to tend to urge the cap member outwardly thus holding the or each lug on the cap firmly against a face of the fixed support member so as to hold the complete assembly firmly in position and prevent any possible rotation of the assembly of housing and cap when mounted in the support member.

Although, in an inexpensive version of such bearing assembly the bearing housing itself may provide an internal bearing surface, it is preferred to provide a separate bearing sleeve within the bearing housing in order to enable a degree of self-alignment to be incorporated in the complete assembly. For this purpose there may be provided a bearing sleeve which fits within the housing and which has at each end a reduced section of a part-spherical configuration externally, one end of such bearing sleeve having its part-spherical portion engaging a part-spherical portion formed interiorly of the bearing housing at one end, and at the other end the other part-spherical portion of the bearing sleeve being in engagement with a part-spherical portion of an abutment washer which provides the said abutment for the inner end of the said spring.

This arrangement, therefore, provides a resiliently mounted bearing sleeve which, by virtue of its part-spherical end configuration, provides a certain degree of self-alignment for the complete assembly when mounted within the support member and with a shaft extending through the bearing sleeve.

BRIEF DESCRIPTION OF THE DRAWINGS

The invention is illustrated by way of example in the accompanying drawings wherein:

FIG. 1 is an exploded perspective view of a bearing assembly according to the invention.

FIG. 2 is a section through the bearing assembly in the working condition.

DESCRIPTION OF THE PREFERRED EMBODIMENT

In the drawings the support member is shown in the form of a vertically extending bracket 10 of platelike form and having extending therethrough an opening 11 which is generally of circular form except for the provision at diametrically opposed positions of two small part-circular apertures 12 extending through the plate and communicating with the periphery of the opening 11 through the plate.

The bearing housing 13 is of generally cylindrical form and has a circular cross section opening extending therethrough which is of constant diameter except that at one end 14 the opening is of reduced cross section and adjacent this end the internal surface 15 is formed to a part-spherical configuration. At the end part of the housing 13 remote from such reduced section 14 there is formed on the exterior thereof a radially extending rib 16 which is spaced a short distance away from this end face of the housing and which is discontinuous, being interrupted at two diametrically opposed positions by slots 17 which pass through the rib and are contiguous with two grooves 18 extending along the exterior of the housing parallel to the axis thereof to the other end of the housing. As will be seen the base of each groove 18 and slot 17 is of the same diameter as the end part 19.

Fitted within the housing is a bearing sleeve 20 having an aperture 21 extending axially therethrough for running engagement with the shaft 22 which the housing is to support and which has at each end a reduced section 23 formed externally to part-spherical configuration so that when fitted within the bearing housing 13 one end of said bearing sleeve 20 (the right hand in FIG. 2) has mating engagement with the reduced portion of part-spherical configuration 15 within the bearing housing. There is provided, for the other end of the bearing sleeve 20, a washer 24 of circular form but having internally a part-spherical configuration (see FIG. 2) which has mating engagement with the other end 23 of part-spherical configuration of the bearing sleeve 20.

An end cap 25 is provided to fit over the end of the housing 13 which is adjacent the aforesaid rib 16 and which has in its flat end face a central opening 26 through which the shaft 22 may project. Extending away from this end face and formed integrally with the cylindrical wall of the end cap is a pair of arms 27 disposed at diametrically opposed positions and each arm having at its free end a radially outwardly presented lug 28. The position of the arms 27 and dimensions thereof are such that when assembled on the end of the bearing housing the arms pass through the slots 17 in the rib 16 on the exterior of the housing and lie in the grooves 18, which are contiguous with such slots, and the inner end 29 of the cylindrical wall of the end cap 25 abuts against the outer flat faces of the discontinuous rib 16.

Before assembling the end cap on to the housing there is fitted within the end cap, and within this end of the housing, a small coil spring 30 which thus has one end bearing against the inner surface of the end face of the end cap 25 and its other end bearing against the washer 24 which is seated against the adjacent end of the bearing sleeve 20 and thus the spring is tending to act to move the end cap 25 outwardly away from the cylindrical housing 13.

To assemble the complete bearing, the assembly of bearing housing 13, bearing sleeve 20, spring 30 and end cap 25 is presented to the projecting end of the shaft 22, passing through the opening 11 in the support member 10 and passed over this end of the shaft until the housing 13 passes through the opening in the support plate and the rib 16 on the exterior of the housing comes into engagement with the one side face of the support member 10. Further pressure upon the end cap 25, to overcome the resistance of the spring 30, then moves the end cap 25 relatively to the housing 13 so that the lugs 28 on the arms 27 of the end cap pass completely through their two mating apertures 12 in the support member and the inner end 29 of the end cap comes into engagement with the rib 16 on the exterior of the housing.

At this stage an angular rotary movement of the end cap 25, which also results in a corresponding angular movement of the bearing housing 13 will result in the aforesaid lugs 28 on the end cap being moved out of register with their apertures 12 and an angular movement of about 90° will then leave the lugs bearing against the remote side face of the support member (see FIG. 2) thus preventing the end cap 25 from moving outwardly and, because of the spring pressure acting upon the end cap, holding the complete assembly of bearing housing 13 and end cap firmly in position and preventing any tendency for rotation of the bearing housing 13 due to rotary motion of the shaft which passes therethrough.

Thus the complete bearing assembly comprises a small number of parts which can be relatively easily manufactured at relatively little cost by mass production techniques and which are easy to assemble together and to assemble into the complete bearing support without necessitating the use of highly skilled labor.

I claim:

1. A bearing assembly for a rotary shaft, comprising a fixed support member having an opening extending therethrough, the periphery of said opening being closed and being of generally circular shape, having two relatively angularly spaced, generally radially extended portions; a bearing housing having an externally generally cylindrical portion which engages within said opening, said portion including a pair of axial grooves in the exterior thereof, said grooves being relatively angularly spaced to correspond with said generally radially extended portions of the periphery of the opening, and said housing also having a pair of radially outwardly directed abutments extending circumferentially around said generally cylindrical portion and arranged at relatively angularly spaced positions, said axial grooves being disposed alternately therebetween and the radial size of the abutments being greater than that of said opening so as to prevent said abutments from passing through said opening; an end cap which fits on the end of the bearing housing remote from said fixed support member and which includes a pair of axially extending, relatively angularly spaced arms slidably engaging within said axial grooves, each of said arms having at the end thereof remote from the cap a radially outwardly projecting lug so that, on passing the bearing housing with the cap fitted thereon into the opening, the lugs pass through the opening at the radially extended portions of the periphery thereof, rotation of the housing with the cap fitted thereon moving the lugs out of register with said radially extended portions, thereby preventing withdrawal of the bearing housing and cap from the support member; a tubular bearing sleeve which is adapted to be mounted on the rotary shaft and which fits within the housing, the bearing sleeve having at each end thereof a reduced portion of part-spherical external configuration, the housing including, at the end thereof which is engaged within the aperture of the support member, an interior part-spherical portion within which one of said part-spherical portions of said bearing sleeve engages; an abutment washer provided within the housing at the end thereof remote from the support member, said washer having a part-spherical portion which engages the other of said part-spherical portions of said bearing sleeve; and spring means located between said abutment washer and said end cap so as to tend to urge said end cap in a direction away from said fixed support member.